United States Patent
Guisto et al.

(10) Patent No.: US 12,385,634 B2
(45) Date of Patent: Aug. 12, 2025

(54) STEAM GENERATOR, IN PARTICULAR FOR OVENS

(71) Applicant: I.R.C.A. S.P.A. INDUSTRIA RESISTENZE CORAZZATE E AFFINI, Vittorio Veneto (IT)

(72) Inventors: Francesco Guisto, Mestre (IT); Giacomo Durigon, Quinto di Treviso (IT); Luigino De Toffoli, Mareno di Piave (IT); Stefano Zanella, Montebelluna (IT); Frederico Zoppas, Treviso (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 891 days.

(21) Appl. No.: 17/625,292

(22) PCT Filed: Jul. 9, 2020

(86) PCT No.: PCT/IB2020/056446
§ 371 (c)(1),
(2) Date: Jan. 6, 2022

(87) PCT Pub. No.: WO2021/005543
PCT Pub. Date: Jan. 14, 2021

(65) Prior Publication Data
US 2022/0316699 A1    Oct. 6, 2022

(30) Foreign Application Priority Data

Jul. 11, 2019   (IT) .................. 102019000011478

(51) Int. Cl.
*F22B 37/30* (2006.01)
*F22B 1/28* (2006.01)
(Continued)

(52) U.S. Cl.
CPC ............. *F22B 37/30* (2013.01); *F22B 1/28* (2013.01); *F22B 1/284* (2013.01); *F22B 37/28* (2013.01);
(Continued)

(58) Field of Classification Search
CPC .. F22B 37/30; F22B 1/28; F22B 1/284; F22B 37/28; F22B 37/40; F24C 15/003; F24C 15/327; A21B 3/04
See application file for complete search history.

(56) References Cited

U.S. PATENT DOCUMENTS

| | | | |
|---|---|---|---|
| 2010/0282448 A1* | 11/2010 | Singh | F22B 37/30 165/157 |
| 2019/0320505 A1* | 10/2019 | Lee | F22B 1/28 |
| 2022/0057087 A1* | 2/2022 | Shin | F24C 15/327 |

FOREIGN PATENT DOCUMENTS

| | | | |
|---|---|---|---|
| CN | 206692930 U | 12/2017 | |
| CN | 107850359 A * | 3/2018 | F22B 37/30 |

(Continued)

OTHER PUBLICATIONS

CN-107850359-A English translation (Year: 2018).*
(Continued)

*Primary Examiner* — Steven S Anderson, II
*Assistant Examiner* — Kurt J Wolford
(74) *Attorney, Agent, or Firm* — Amster, Rothstein & Ebenstein LLP (57) ABSTRACT

A steam generator (1), in particular for an oven, comprising a tank (3) provided with an inlet pipe (4) suitable for introducing liquid into the tank (3) and an outlet pipe (5) suitable for releasing steam from the tank (3); at least one heating element (2) adapted to heat the liquid to produce the steam; wherein the tank (3) comprises: a first chamber (31); a second chamber (32); a third chamber (33), proximal to the (Continued)

outlet pipe (5); wherein the first chamber (31) and the second chamber (32) are adapted to contain the liquid introduced by means of said inlet pipe (4); wherein a first partition wall (41) is provided, which partially separates the first chamber (31) and the second chamber (32) from each other; wherein a second partition wall (42) is provided, which separates at least partially both the first chamber (31) and the second chamber (32) from the third chamber (33); wherein a first passage (21) is provided which allows the steam to pass from the first chamber (31) to the second chamber (32); wherein a second passage (22) is provided which allows the steam to pass from the second chamber (32) to the third chamber (33); wherein a third passage (23) is provided which allows the liquid to pass between the second chamber (32) and the first chamber (31), near the bottom (6) of the tank (3).

17 Claims, 7 Drawing Sheets

(51) Int. Cl.
*F22B 37/28* (2006.01)
*F22B 37/40* (2006.01)
*F24C 15/00* (2006.01)
*F24C 15/32* (2006.01)
*A21B 3/04* (2006.01)

(52) U.S. Cl.
CPC ............ *F22B 37/40* (2013.01); *F24C 15/003* (2013.01); *F24C 15/327* (2013.01); *A21B 3/04* (2013.01)

(56) References Cited

FOREIGN PATENT DOCUMENTS

| | | |
|---|---|---|
| EP | 2565542 A1 | 3/2013 |
| EP | 3457027 A2 | 3/2019 |
| FR | 2958727 A1 | 10/2011 |
| JP | 08261402 A | 10/1996 |
| WO | 2018/143641 A1 | 8/2018 |

OTHER PUBLICATIONS

International Search Report, dated Oct. 28, 2020, for corresponding International Patent Application No. PCT/IB2020/056446.

* cited by examiner

STEAM GENERATOR, IN PARTICULAR FOR OVENS

CROSS REFERENCE TO RELATED APPLICATIONS

This application is a national phase of PCT application No. PCT/IB2020/056446, filed Jul. 9, 2020, which claims priority to IT patent application No. 102019000011478, filed Jul. 11, 2019, all of which are incorporated herein by reference thereto.

FIELD OF THE INVENTION

The present invention relates to a steam generator. The steam generator is particularly adapted to be used in an oven that provides steam cooking, in particular steam cooking and cleaning.

PRIOR ART

Ovens for steaming food, which generally also provide steam cleaning, are known. A steam generator is provided for the production of steam, which comprises a heater and a tank containing the water to be heated to generate steam.

A problem of the current steam generators for ovens relates to the control of the fluid which is released from the steam generator and is introduced into the oven. Indeed, in addition to steam, splashes of hot water, generated in particular by the turbulent motion of the boiling water, may also be released from the steam generator.

In an attempt to solve this problem, the current steam generators can be filled to a maximum of about 30% of their inner volume. The remaining inner volume must be left empty to attempt to contain the splashes of water inside the tank so that mostly steam is introduced into the oven.

Therefore, the current solutions do not make it possible to make the best use of the inner volume of the tank.

Disadvantageously, the tank must be filled too frequently with new water to be heated, also because the steam generator must remain compact in size.

Furthermore, the current technical solutions do not completely prevent the release of splashes of water from the steam generator.

Other problems of the current steam generators relate to the formation of limescale inside the tank and the stagnation of water in the tank at the end of the step of steam production.

Therefore, the need is felt to overcome the disadvantages of current steam generators, in particular for ovens.

SUMMARY OF THE INVENTION

It is an object of the present invention to make a steam generator that prevents or limits the splashing of water from its tank during the step of steam generation.

In particular, an object of the invention is to make a steam generator, in particular of compact size, which makes it possible to avoid or limit the release of splashes of water from its tank, the inner volume of which can be filled more efficiently than the prior art.

It is another object of the present invention to prevent water stagnation in the tank at the end of the step of steam generation.

It is another object of the present invention to facilitate the removal of limescale residues which may form in the tank.

The present invention achieves at least one of such objects, and other objects which will be apparent in light of the present description, by means of a steam generator, in particular for an oven, comprising a tank provided with at least one inlet pipe suitable for introducing liquid into the tank and at least one outlet pipe suitable for releasing steam from the tank;
  at least one heating element adapted to heat the liquid to produce the steam;
  wherein the tank comprises: a first chamber or zone; a second chamber or zone; a third chamber or zone, proximal to the outlet pipe; wherein the first chamber or zone and the second chamber or zone are adapted to contain the liquid introduced by means of said inlet pipe; wherein a first partition wall is provided, which partially separates the first chamber or zone and the second chamber or zone from each other; wherein a second partition wall is provided, which separates at least partially, e.g. partially, both the first chamber or zone and the second chamber or zone from the third chamber or zone; wherein a first passage is provided which allows the steam to pass from the first chamber or zone to the second chamber or zone; and
  wherein a second passage is provided which allows the steam to pass from the second chamber or zone to the third chamber or zone.

At least one further passage, or third passage, distinct or different from the first passage and from the second passage is preferably provided, which allows the liquid to pass between the first chamber and the second chamber, in particular allows a direct passage of liquid.

In particular, the liquid introduced through the inlet pipe can fill both the first chamber and the second chamber, in particular at the same time.

Said at least one further passage is preferably near or at the bottom of the tank. The liquid fraction of boiling water can pass directly from the third chamber to the first chamber by means of at least one passage, or fourth passage (optional), distinct from the first passage and from the second passage, and/or by passing through the second passage to be introduced into the second chamber, from which it can then return to the first chamber, preferably by means of said third passage.

In other words, preferably in all embodiments, the third passage allows the passage, between the first chamber and the second chamber, of the liquid introduced into the tank through the inlet pipe. The third passage also allows the passage of the liquid fraction of the water coming from the second chamber into the first chamber.

The invention further relates to an oven for steam cooking and preferably also for steam cleaning the oven, wherein the oven comprises at least one further tank connected to the tank of the steam generator, the further tank being in particular adapted to be used as an auxiliary reserve of liquid.

Advantageously, the tank can be filled to 60% or 70% of its inner volume without having releases of splashes of water from the outlet pipe during the generation of steam.

Advantageously, the steam generator is also simple to construct.

Preferably, the third chamber or zone is arranged between the outlet pipe and the first chamber or zone, and/or the third chamber or zone is arranged between the outlet pipe and the second chamber or zone.

The second partition wall allows the direct passage of steam from the first chamber to the third chamber to be limited.

Therefore, most of the steam produced by heating the liquid in the first chamber first passes from the first chamber to the second chamber, and then from the second chamber to the third chamber to then be released from the outlet pipe.

The liquid fraction of the boiling water can advantageously return to the first chamber, coming directly from the third chamber, preferably by means of the fourth passage; and/or by first passing through the second chamber and to then reach the first chamber, preferably by means of said third passage. The water which returns to the first chamber was previously heated. Therefore, the steam production process is particularly efficient.

Note that the liquid in the first chamber heats up faster than the liquid in the second chamber because the first chamber is preferably closer to the heating element. In particular, the heating element is preferably closer with respect to the first chamber and further with respect to the second chamber and preferably also further with respect to the third chamber.

Preferably, the second partition wall is shaped and arranged to facilitate the flow of liquid from the third chamber towards the first chamber and/or towards the second chamber by gravity.

Preferably, the steam generator is L-shaped to optimize its dimensions when assembled with an oven, without having to reduce the capacity of the steam generator tank.

Preferably, the steam generator is designed so that at least one of its walls can be arranged vertically, e.g. with respect to an oven support surface, and the bottom is inclined so that liquid can be released from the inlet pipe by gravity.

Preferably, at least one venting pipe is provided to prevent the inner pressure of the tank from increasing excessively, e.g. so that the inner pressure of the tank is substantially equal to the atmospheric pressure.

Advantageously, the steam generator makes it easier to remove limescale, in particular when the bottom of the tank is inclined, when the steam generator is assembled with the oven. Indeed, the limescale can slide on the bottom towards the inlet pipe, through which maintenance operations can be carried out. The detachment of limescale is also facilitated by providing that the wall to which the heating element is attached is adapted to be a vertical wall, in particular when the steam generator is assembled with the oven.

Advantageously, a steam generator according to the invention can also be used in other electrical appliances, in particular household appliances, which involve the production of steam, e.g. washing machines, tumble dryers, dishwashers, and medical appliances, e.g. for the sterilization of articles.

Further features and advantages of the present invention will become more apparent in light of the detailed description of preferred, but not exclusive embodiments.

The dependent claims describe particular embodiments of the invention.

BRIEF DESCRIPTION OF THE FIGURES

The description of the invention refers to the accompanying drawings, which are provided by way of non-limiting example, in which.

The same elements or parts have the same reference numerals.

DESCRIPTION OF EXAMPLE EMBODIMENTS OF THE INVENTION

A steam generator 1 according to the invention is described with reference to the figures.

The steam generator 1 is particularly adapted to be used in an oven 100 (FIGS. 10 and 11) for steaming food and steam cleaning the oven itself.

The steam generator 1 comprises a tank 3 adapted to contain the liquid, in particular water, which produces steam when heated.

To feed the water into the tank 3, the latter is provided with an inlet, in particular an inlet pipe 4.

For releasing the steam from the tank 3, the latter is provided with an outlet, in particular an outlet pipe 5.

The tank 3 has a bottom 6, or bottom wall, i.e. a surface which acts as a lower containment for the liquid introduced into the tank 3 through the inlet pipe 4.

Preferably, the inlet pipe 4 is proximal to the bottom 6 of the tank 3 and the outlet pipe 5 is distal from the bottom 6. In other words, the inlet pipe 4 and the outlet pipe 5 are preferably in a lower zone and an upper zone of the tank 3, respectively.

Figure 6:
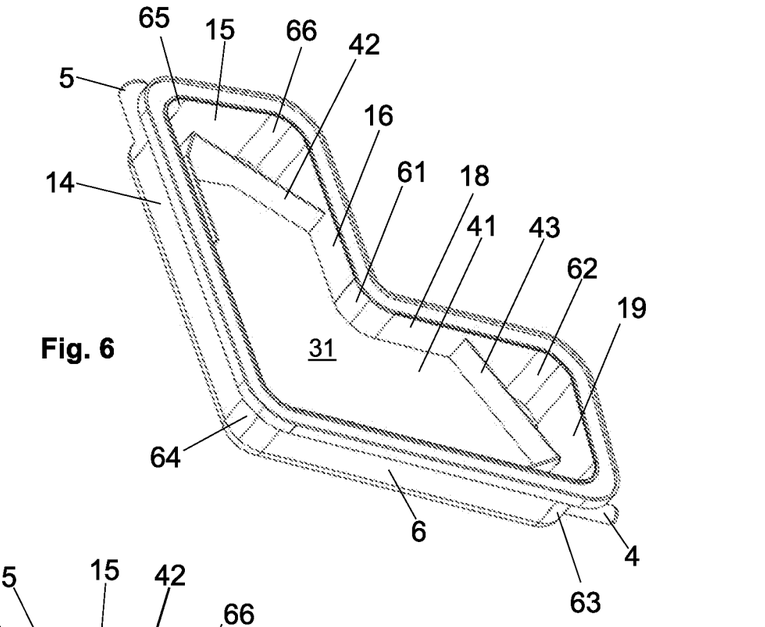
FIG. 6 shows another perspective view of the components shown in FIG. 3.
Figure 7:
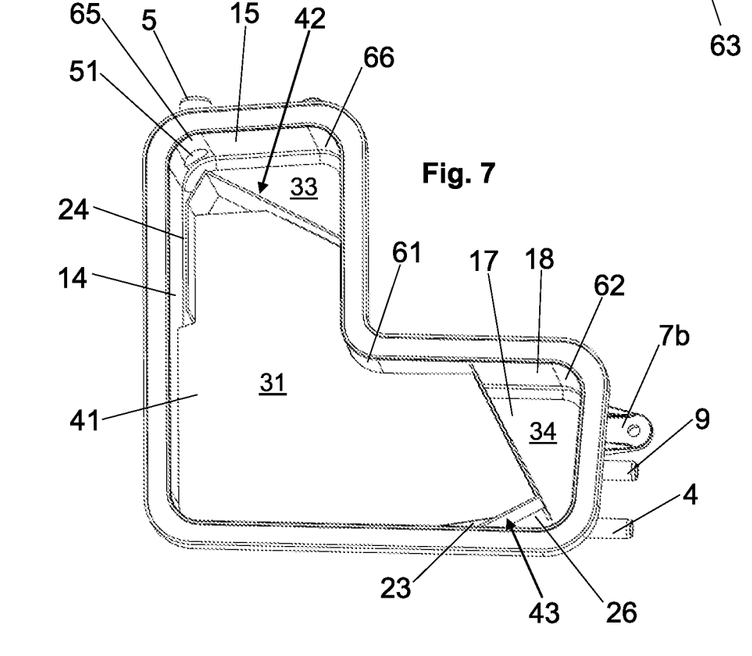
FIG. 7 shows another perspective view of the components shown in FIG. 3.

More in detail, with particular reference to FIGS. 6 and 7, the outlet pipe 5 extends outwards from the tank 3 from a wall 15 of the tank 3 which is preferably opposite to the bottom 6. In particular, the wall 15 is preferably an upper wall of the tank 3. The wall 15 also preferably comprises two connecting portions 65, 66, preferably curved. The wall 15 is connected to the wall 14 by means of the connecting portion 65 and is connected to the wall 16 by means of the connecting portion 66. The wall 14 and the wall 16 are preferably opposite to each other, preferably parallel to each other. Preferably, the outlet pipe 5 extends from the connecting portion 65 of the wall 15. In particular, an opening 51 of the outlet pipe 5 is obtained in the connecting portion 65. Preferably, the portion of wall 15 which extends between the connecting portions 65, 66 is orthogonal or substantially orthogonal to the wall 14 and/or to the wall 16.

The inlet pipe 4 extends, towards the outside of the tank 3, from a wall 19 preferably proximal to the bottom 6. In particular, the wall 19 comprises two connecting portions 62, 63, preferably curved. The wall 19 is connected to the bottom 6 by means of the connecting portion 63 and is connected to the wall 18 by means of the connecting portion 62. The wall 18 and the bottom 6 are preferably opposite to each other, preferably parallel to each other. Also, preferably, the wall 19 is opposite to the wall 14. The wall 19 is preferably a side wall, in particular a lower side wall, of the tank 3.

Preferably, the portion of wall 19 which extends between the connecting portions 62, 63 is orthogonal or substantially orthogonal to the wall 18 and/or to the bottom 6.

The inlet pipe 4 and the outlet pipe 5 extend about a respective axis and preferably, but not exclusively, the axis of the inlet pipe 4 and the axis of the outlet pipe 5 mutually form an angle between 90° and 270° or between 90° and 180° or between 90° and 140°, e.g. of about 95°. Preferably, said angle is greater than 90°.

Preferably, the inlet pipe 4 has a section, in particular an inner section, which is smaller than or equal to the section, in particular the inner section, of the outlet pipe 5.

To heat the water, the steam generator 1 is provided with at least one heating element 2, e.g. only one heating element 2, or heater.

Figures 5, 5A, 5B:
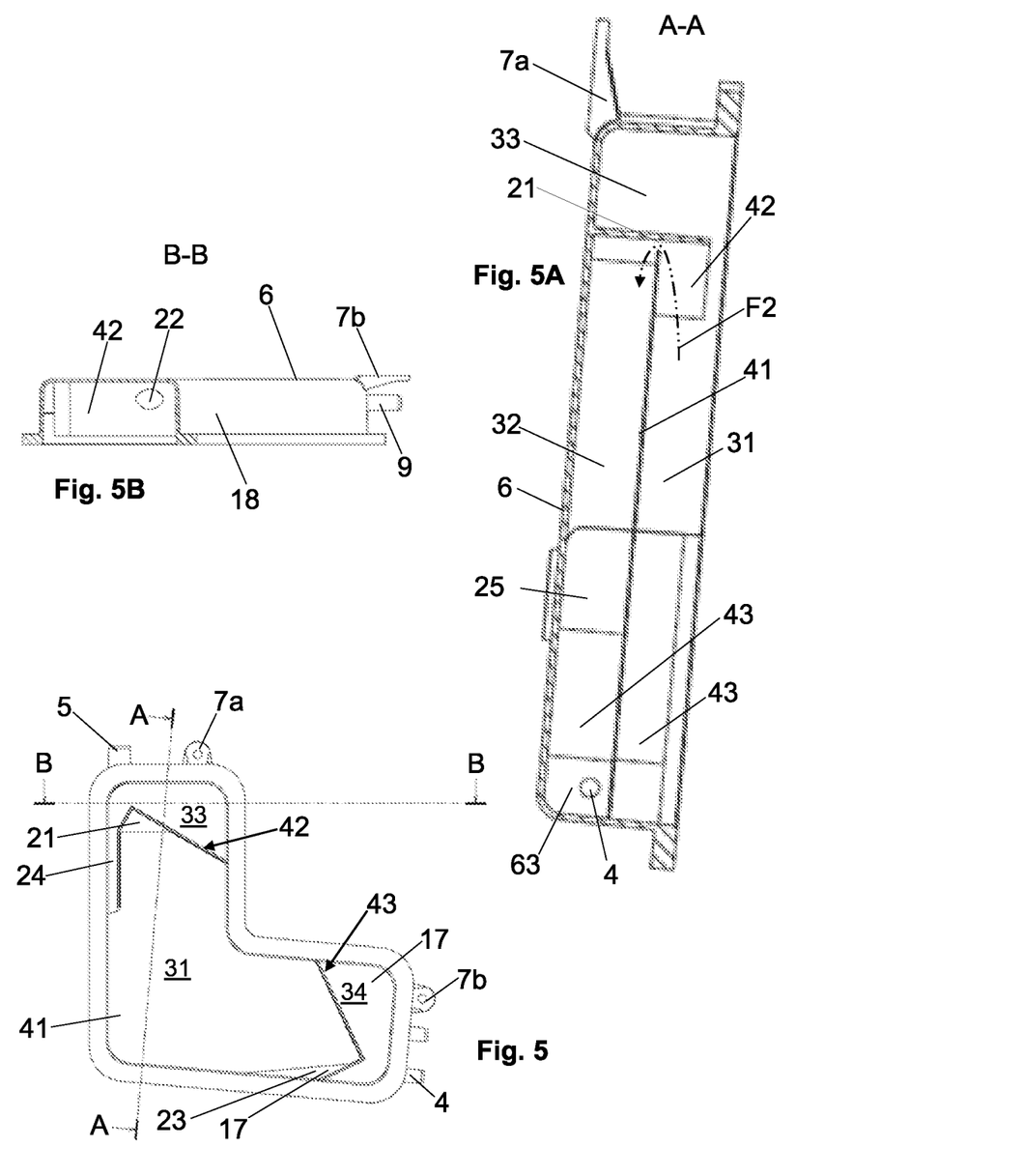
FIG. 5 shows a plan view of the components shown in FIG. 3.
FIG. 5A shows section A-A in FIG. 5.
FIG. 5B shows section B-B in FIG. 5.

The tank 3 is advantageously divided into at least three chambers or zones 31, 32, 33 communicating with each other (see in particular FIGS. 5 and 5A).

A first chamber or zone 31 is preferably proximal to the heating element 2.

A second chamber or zone 32 (indicated in 5A) is preferably distal from the heating element 2; in particular, the first chamber 31 is preferably arranged between the heating element 2 and the second chamber 32.

A third chamber or zone 33 is preferably proximal to the outlet pipe 5.

Figures 8, 9:
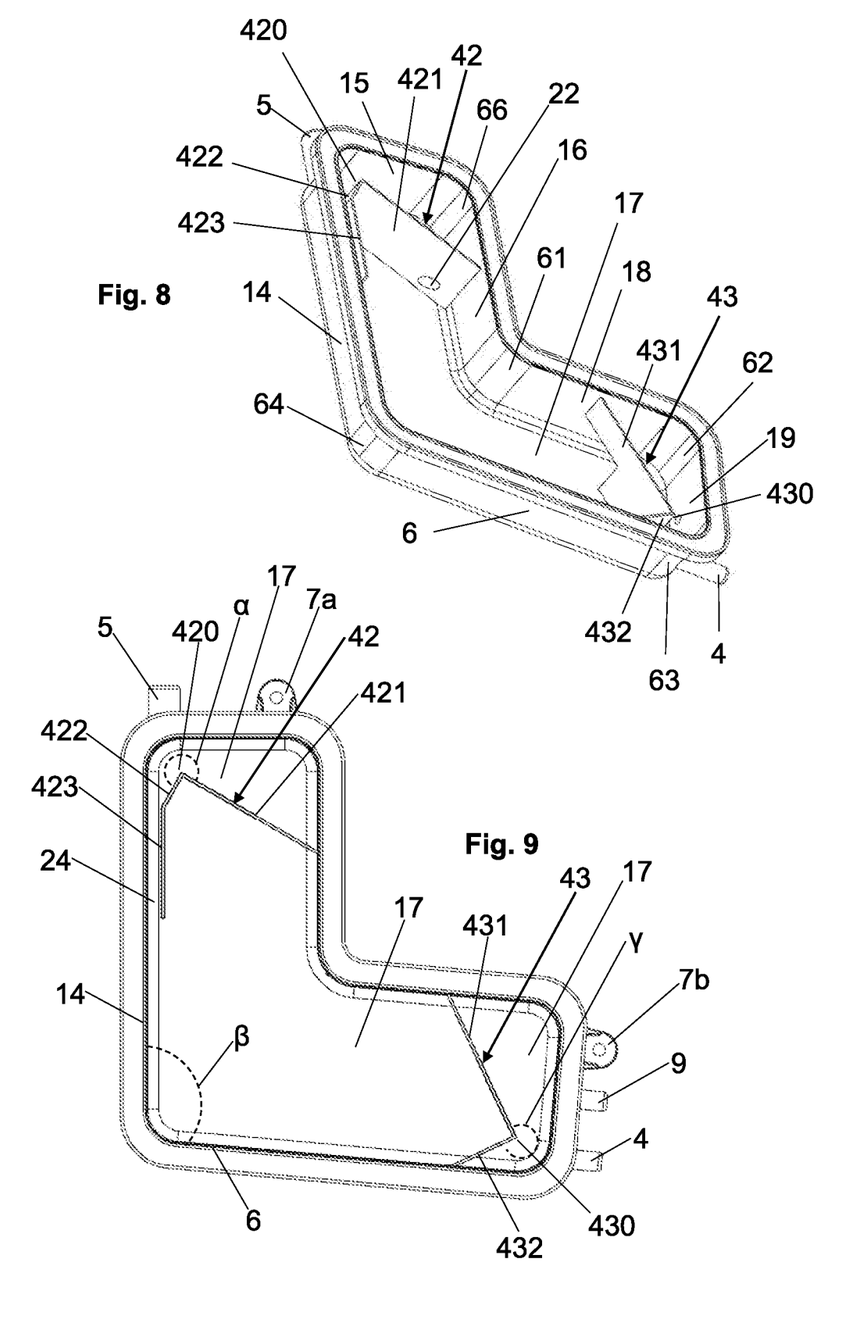
FIG. 8 shows a perspective view of the components shown in FIG. 3, from which a component was removed for the sake of illustration.
FIG. 9 shows a plan view of the components shown in FIG. 8.

In particular, a first partition wall 41 is provided, which partially separates the first chamber 31 and the second chamber 32 from each other. In FIGS. 8 and 9, the first partition wall 41 is not shown to better illustrate the inside of the tank 3.

Furthermore, a second partition wall 42 is provided, which partially, or at least partially, separates both the first chamber 31 and the second chamber 32 from the third chamber 33.

Preferably, the first partition wall 41 and the second partition wall 42 are mutually transversal, e.g. mutually perpendicular or substantially perpendicular.

A first passage 21 allows the steam to pass from the first chamber 31 to the second chamber 32. Preferably, the first passage 21 is delimited by the first partition wall 41 and by the second partition wall 42.

A second passage 22 allows the steam to pass from the second chamber 32 to the third chamber 33. Preferably, the second passage 22 is obtained in the second partition wall 42. By way of non-limiting example, the second passage 22 may be formed by at least one hole, e.g. one hole, obtained in the second partition wall 42. The first passage 21 and the second passage 22 are mutually distinct.

The first passage 21 and the second passage 22 are preferably in an upper zone of tank 3, in particular, they are arranged in the upper zone which comprises also the outlet pipe 5.

The third chamber 33 is preferably arranged above the first chamber 31 and above the second chamber 32.

In particular, the third chamber 33 is arranged between the outlet pipe 5 and the first chamber 31, and between the outlet pipe 5 and the second chamber 32.

Preferably, the third chamber 33 communicates directly with the outlet pipe 5. In particular, preferably, the third chamber 33 is delimited at the top by the wall 15 provided with the outlet pipe 5.

Preferably, but not exclusively, the bottom 6 of the tank 3 is also the bottom of the first chamber 31 and of the second chamber 32.

Advantageously, the inner division of the tank 3 makes it possible to fill the tank 3 to 60% or 70% of its inner volume without releases of splashes of water from the outlet pipe 5 during the generation of steam.

In particular, the second partition wall 42 is arranged to limit the direct flow of steam from the first chamber 31 to the third chamber 33.

Figure 4:
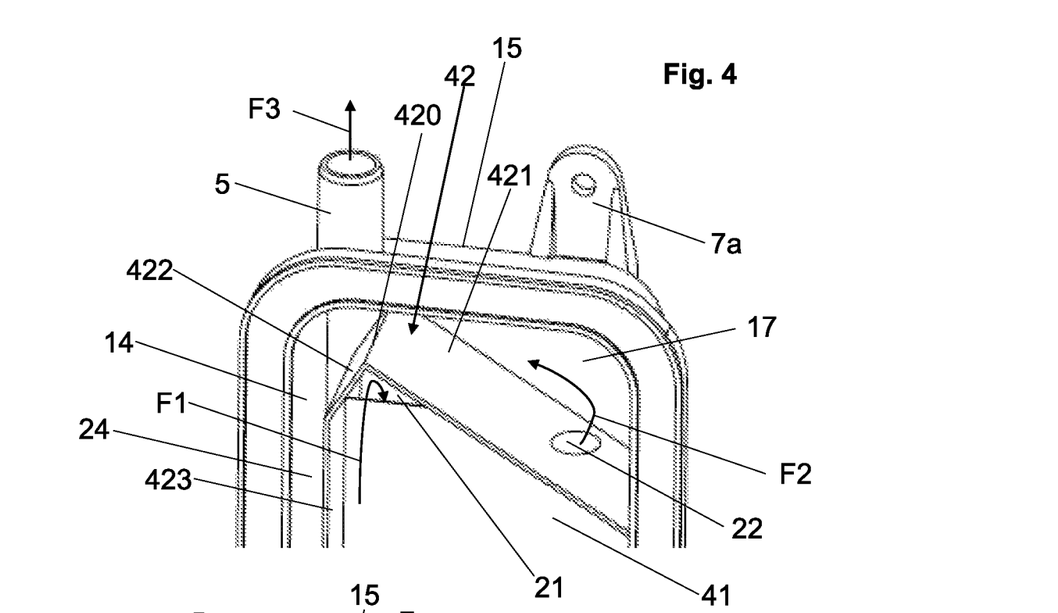
FIG. 4 shows an enlarged detail of FIG. 3.

In particular, most of the steam produced by the heating of the liquid in the first chamber 31 passes first from the first chamber 31 to the second chamber 32, and then from the second chamber 32 to the third chamber 33, and then exits from the outlet pipe 5. The path followed by the steam is diagrammatically shown by the arrows F1, F2, F3 in FIGS. 4 and 5A.

The liquid fraction of the boiling water can advantageously return to the first chamber 31, coming directly from the third chamber 33 and/or passing first through the second chamber 32 to then reach the first chamber 31. The water which returns to the first chamber 31 was previously heated. Therefore, the steam production process is particularly efficient.

In particular, a third passage 23 allows the steam to pass between the second chamber 32 and the first chamber 31. The third passage 23 is preferably near or at the bottom 6 of the tank 3. The third passage 23 is preferably near the inlet pipe 4. The third passage 23 is distinct from the first passage 21 and the second passage 22.

Preferably, but not exclusively, the third passage 23 is partly delimited by the bottom 6 of the tank 3.

Preferably, but not exclusively, the third passage 23 is delimited by the bottom 6 of the tank 3 and by the first partition wall 41.

The third passage 23 may also be provided in other zones, e.g. may be completely or partially delimited by the first partition wall, e.g. may be obtained in the first partition wall.

The third passage 23 allows the passage of the liquid introduced into the tank 3 through the inlet pipe 4. According to the principle of communicating vessels, the liquid level in the first chamber 31 and the second chamber 32 is substantially the same, in particular when the heating element 2 is off.

The third passage 23 also allows the passage of the liquid fraction of the water from the second chamber 32 into the first chamber 31.

By way of non-limiting example, the third passage 23 may be, for example, at a distance, in particular a minimum distance, from the bottom 6 from 0 to 10 cm, or from 0 to 5 cm. In particular, the value "0" relates to the case in which the third passage 23 is partly delimited by the bottom 6 of the tank 3, e.g. when the third passage 23 is delimited by the bottom 6 of the tank 3 and the first partition wall 41 To facilitate the flow of the liquid fraction of the water towards the first chamber 31 and/or towards the second chamber 32, the second partition wall 42 preferably comprises a first portion 421 and a second portion 422 which are mutually inclined. Preferably, the first portion 421 and the second portion 422 form an angle α (indicated in FIG. 9), the apex 420 of which faces towards the wall 15 of the tank 3 preferably towards the portion of the wall 15 which extends between the two connecting portions 65, 66 or towards the connecting portion 65. The wall 42 may also be made in different manners. For example, the wall 42 may be curved, and, in particular, may be provided with a portion which is convex towards the wall 15.

Preferably, the aforesaid angle α has a width greater than 180°, preferably between 200° and 300° or between 240° and 280, e.g. about 270°.

Note that the angle α is the angle proximal to said wall 15 formed by the two portions 421, 422.

The first portion 421 and the second portion 422 are preferably above the first partition wall 41.

Preferably, the first portion 421 and the second portion 422 are mutually consecutive.

The liquid fraction of water can reach the second chamber 32 passing through the second passage 22 and can reach the first chamber 31 through the third passage 23. In particular, through the third passage 23, the liquid can pass, in particular directly, from the second chamber 32 to the first chamber 31.

Preferably, there is a fourth passage 24 which allows the liquid to pass from the third chamber 33 directly to the first chamber 31 and/or from the third chamber 33 to the second chamber 32. Preferably, the fourth passage 24 is partly delimited by the wall 14 of the tank 3 and/or partly by the second partition wall 42.

For example, the second partition wall 42 may optionally also comprise a third portion 423 facing the wall 14 of the tank 3. The third portion 423 and the wall 14 are mutually distanced so that the fourth passage 24 is delimited, at least partially, by the third portion 423 and by the wall 14. Preferably, the distance between the third portion 423 and the wall 14 is comprised between 1 and 17.5 mm, e.g. between 2 and 10 mm.

The third portion 423 extends transversely to the second portion 422 and is preferably consecutive to the second portion 422.

Through the fourth passage 24, the liquid fraction of the water can reach, for example, the first chamber 31 and the second chamber 32 through a respective passage, preferably partly delimited by the first partition wall 41.

Figures 1, 2:
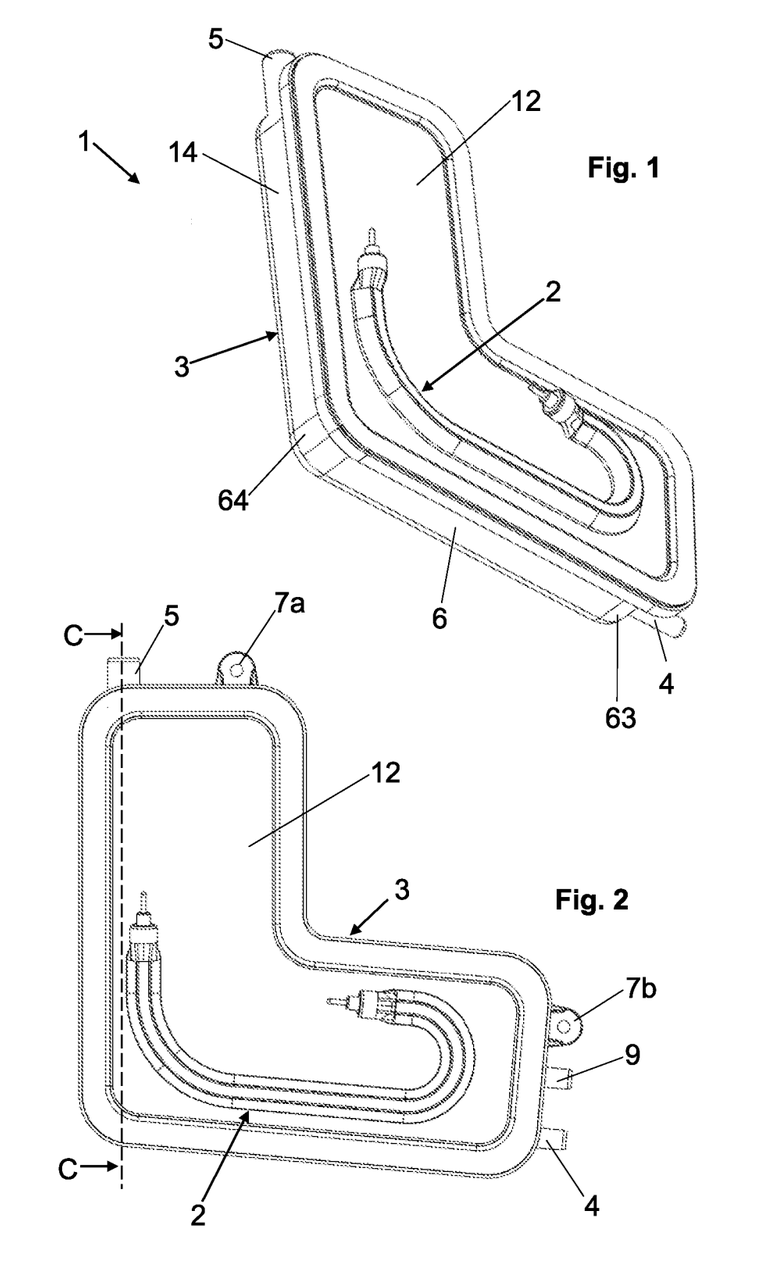
FIG. 1 shows a perspective view of a steam generator according to the invention.
FIG. 2 shows a plan view of the steam generator in FIG. 1.
Figure 2A:
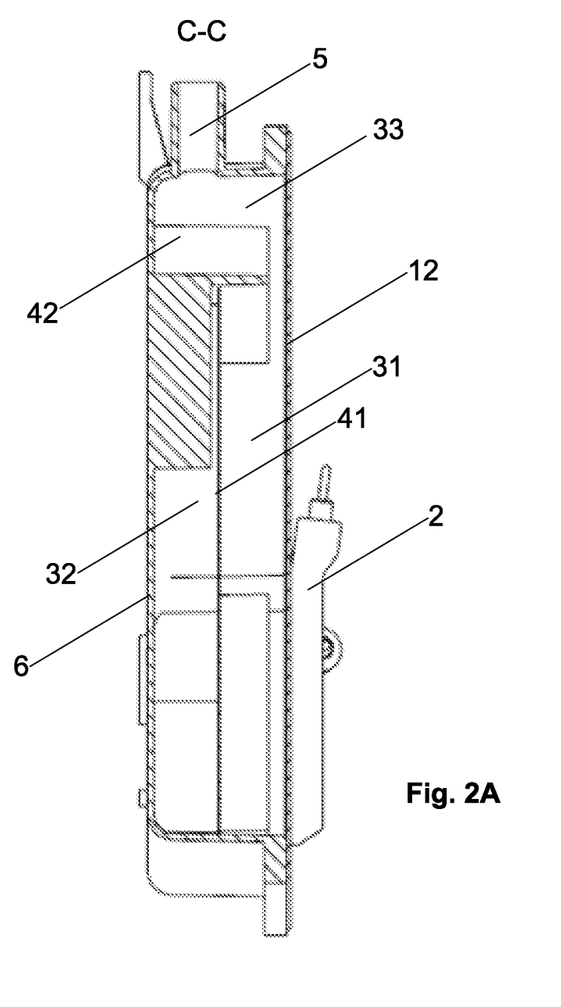
FIG. 2A shows section C-C in FIG. 2.

With particular reference to FIGS. 1 and 2, the heating element 2 is constrained to a wall 12 which delimits, in particular closes, the first chamber 31.

Preferably, the heating element 2 is arranged outside the tank 3, preferably completely outside the tank 3. In particular, the heating element 2 is fixed to a face of the wall 12 which is outside the tank 3. Alternatively, the heating element 2 can be arranged, fully or partially inside the tank 3.

The wall 12 is preferably an outer wall of the tank 3.

The wall 12 is preferably substantially a cover of the tank 3.

The wall 12 is hermetically fixed with the rest of the tank 3.

Preferably, fixing means (not shown) are further provided, such as screws and nuts and/or elastic means, such as clips or pegs and/or a sealant or glue for fixing the wall 12, which can optionally be unmounted. Alternatively, the wall 12 can be co-molded with the rest of the tank 3.

Preferably, the heating element 2 is of the electrical type. For example, the heating element 2 is a sheathed resistor, i.e. a resistor capable of producing heat when electric current flows through it, provided with a metal outer casing.

Preferably, the heating element 2 extends only at the lower zone of the steam generator 1, in particular of the tank 3, and optionally also at the middle zone of the tank 3. In other words, the heating element 2 does not extend to the upper zone of the steam generator 1, in particular of the tank 3. More in detail, the heating element 2 does not extend at the third chamber 33.

The second partition wall 42 is arranged, in particular, between the two walls 14, 16 of the tank 3 opposite to each other.

Preferably, the outlet pipe 5 is proximal to the wall 14 and distal from the wall 16; and the second passage 22 is proximal to the wall 16 and distal from the wall 14. In this manner, the distance between the second passage 22 and the outlet pipe 5 is advantageously increased, to prevent the release of splashes of water from outlet pipe 5 more effectively.

Preferably, the apex 420, i.e. the edge formed between the two portions 421, 422 of the second partition wall 42, is proximal to the outlet pipe 5 and preferably the second passage 22 is distal from the outlet pipe 5.

In particular, the apex 420 is preferably proximal to the wall 14 and distal from the wall 16. Preferably, the portion 422 has a smaller surface extension than the surface extension of the first portion 421.

Preferably, as mentioned, the second passage 22 is obtained in the second partition wall 42. In particular, the second passage 22 is preferably obtained in the portion 421 of the second partition wall 42. Preferably, the second passage 22 is delimited by the second partition wall 42 and by a wall 17 of the tank 3 opposite to the wall 12 to which the heating element 2 is constrained. Preferably the second passage 22 is further delimited by the first partition wall 41.

Preferably, the wall 17 is parallel or substantially parallel to the wall 12.

Preferably, the wall 17 defines the second chamber 32.

The first partition wall 41 and the second partition wall 42 are arranged between the wall 12 and the wall 17.

In particular, the first partition wall 41 faces both the wall 12 and the wall 17 and is spaced from the walls 12, 17. More in particular, the first partition wall 41, preferably, partly delimits the first chamber 31 and partly delimits the second chamber 32. Preferably, the first partition wall 41 is parallel or substantially parallel to the wall 12. The first partition wall 41 is preferably supported by one or more supporting elements (not shown), e.g. arranged in the first chamber 31 and/or the second chamber 32.

Preferably, the second partition wall 42 extends from the wall 17 towards the wall 12. Preferably, there is a gap between the wall 12 and the partition wall 42. Preferably, the second partition wall 42 is in contact with the wall 17, although it is not excluded that a gap can be provided between the wall 17 and the second partition wall 42.

Preferably, the second partition wall 42 is transversal, e.g. perpendicular or substantially perpendicular, to the two walls 12, 17.

Preferably, the bottom 6 of the tank 3 is inclined with respect to the wall 14. For example, the wall 14 and the bottom 6 form an angle β (indicated in FIG. 9), inside the tank 3, preferably between 90° and 179° or between 90° and 140°, e.g. about 95°. Preferably, said angle is greater than 90°.

Advantageously, in this manner, when the wall 14 is arranged vertically, the bottom 6 is inclined so that water can be released from the pipe 4 by gravity or with the help of a pump or solenoid valve, avoiding unwanted water stagnation.

Preferably, but not exclusively, the steam generator 1 is substantially L-shaped. The L-shaped shape is particularly advantageous to optimize the size of the steam generator 1 with respect to the oven 100, without having to reduce the capacity of the tank 3.

Figure 10:
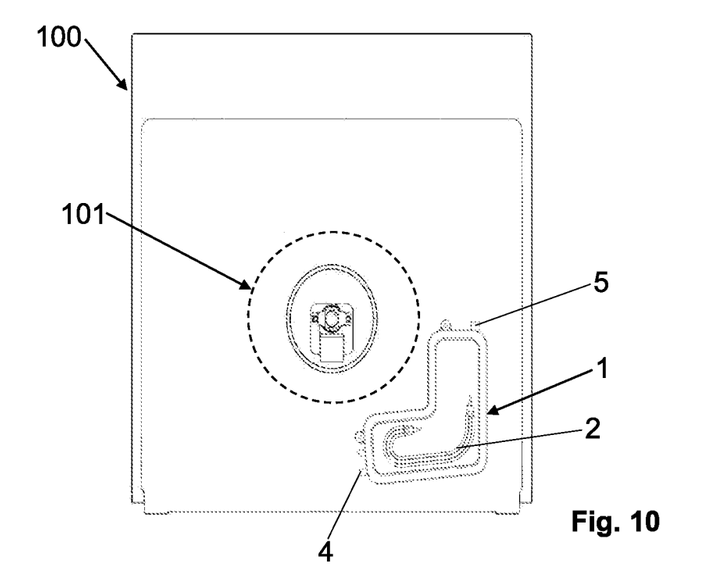
FIG. 10 shows a front view of the back of a first example of an oven provided with a steam generator according to the invention.
Figure 11:
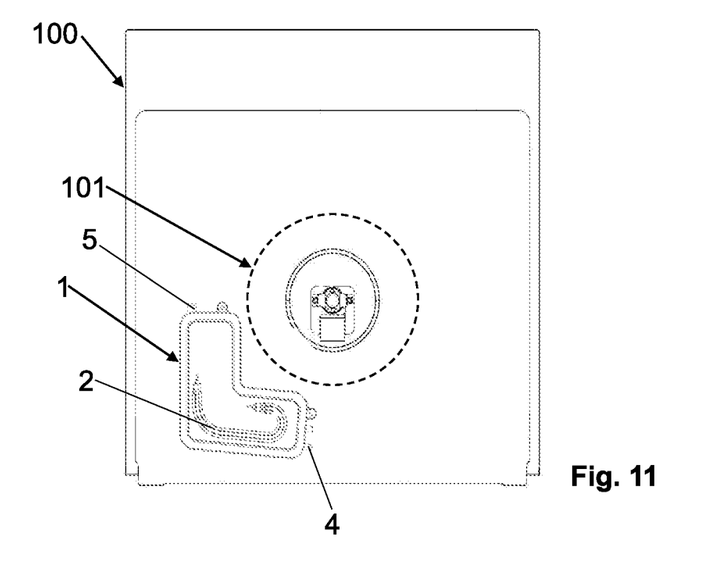
FIG. 11 shows a front view of the back of a second example of an oven provided with a steam generator according to the invention.

With particular reference to FIGS. 10 and 11, the generator 1 may indeed be mounted at the rear part of the oven 100, where other components, such as a fan, fan motor, or other components of the oven 100, can be placed in addition to the steam generator. The zone where the fan is mounted, with its motor, is diagrammatically shown and is indicated by reference numeral 101. However, the steam generator 1 can be positioned in other zones at the rear of the oven, or at the side or top wall of the oven. The fan can still be positioned in a central or off-center zone of the rear part of the oven.

The L-shaped design makes it possible to take advantage of both the space at the side of the fan and the space below the fan.

Observing FIGS. 10 and 11, it can be noted that the L-shaped conformation is also advantageous because the aforesaid space optimization advantages are obtained by mounting the steam generator 1 both in a rear right and in a rear left zone of the oven 100.

Furthermore, the steam generator 1, in particular the tank 3, can be produced with the same mold both when the steam generator 1 is intended to be mounted in the rear right zone and in the rear left zone of the oven 100.

The inlet pipe 4 can be connected to one or more tanks (not shown) adapted to supply the steam generator 1. The outlet pipe 5 can be connected to an additional pipe (not shown) which can conduct the steam into the cooking compartment of the oven 100.

When the steam generator 1 is L-shaped, both the wall 16 and the wall 19, which is preferably the wall provided with the inlet pipe 4, are opposite to the wall 14. The distance between the wall 14 and the wall 16 is smaller, in particular always smaller, than the distance between the wall 14 and the wall 19.

Similarly, both the wall 15 and the wall 18 are opposite the bottom 6. The distance between the bottom 6 and the wall 18 is smaller, in particular always smaller, than the distance between the bottom 6 and the wall 15.

More in particular, the wall 14 preferably extends from the wall 15 to the bottom 6, to which it is connected by means of the connecting portion 64, preferably curved. The wall 16 is shorter than the wall 14. The wall 18 is connected to the wall 16, preferably by means of a connecting portion 61, preferably curved. Preferably, the wall 18 is parallel or substantially parallel to the bottom wall 6.

Preferably, the tank 3 is provided with a venting pipe 9 which prevents, in particular, the inner pressure of tank 3 from increasing excessively. The venting pipe 9 can optionally be connected to an additional pipe (not shown) which, in turn, can be connected directly to the oven cavity, or to one or more auxiliary tanks or boxes, or the venting pipe can be left free in the atmosphere.

Preferably, the venting pipe 9 is in a lower zone of the tank 3, preferably near the inlet pipe 4. For example, the wall 19 is provided both with the inlet pipe 4 and the venting pipe 9.

Preferably, but not exclusively, the tank 3 further comprises a fourth chamber 34 which is proximal to the inlet pipe 4. Preferably, the inlet pipe 4 communicates directly with the chamber 34.

A third partition wall 43 is provided, which separates at least partially both the first chamber 31 and the second chamber 32 from the fourth chamber 34.

The third partition wall 43 is transversal, preferably perpendicular or substantially perpendicular to the first partition wall 41.

Figure 3:
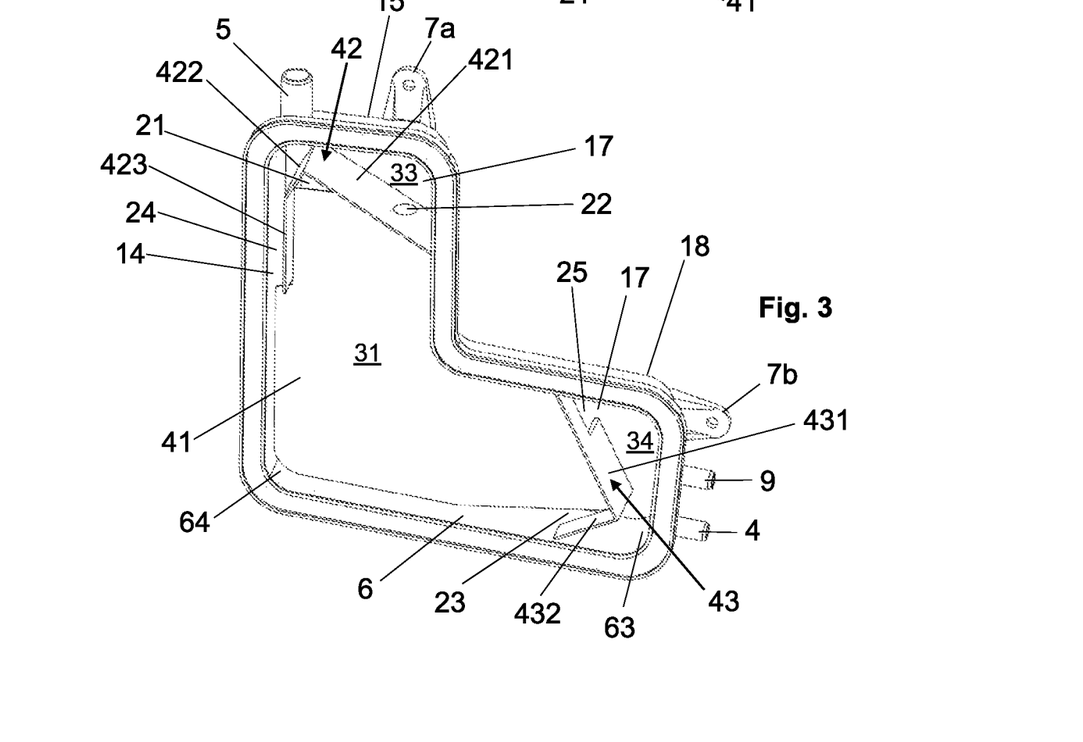
FIG. 3 shows a perspective view of some components of the steam generator in FIG. 1.

A passage 25 (FIG. 3) is provided which allows the steam to pass from the fourth chamber 34 to the second chamber 32. Preferably, the passage 25 is obtained in the third partition wall 43. Preferably, the passage 25 is delimited by the third partition wall 43 and the wall 17.

A passage 26 may be provided (FIG. 7) either additionally or alternatively to the passage 25, which allows the liquid to pass, in particular directly, from the fourth chamber 34 to the first chamber 31.

Preferably, the third partition wall 43 further comprises two mutually inclined portions 431, 432. Preferably, the portion 431 and the portion 432 form an angle γ (indicated in FIG. 9) the apex 430 of which faces the wall 19 of the tank 3 provided with the inlet pipe 4, e.g. towards the portion of the wall 19 which extends between connecting portions 62, 63 or towards the connecting portion 63. The wall 43 may also be made in different manners. For example, the wall 43 may be curved, and, in particular, may be provided with a portion which is convex towards the wall 19. Preferably, said angle γ has a width greater than 180°, preferably between 200° and 300° or between 240° and 280, e.g. about 270°.

It is worth noting that the angle γ is the angle proximal to said wall 19 formed by the two portions 431, 432.

Preferably, the apex 430 is proximal to the inlet pipe 4 and preferably the passage 25 is distal from the inlet pipe 4. Preferably, the passage 25 is proximal to the wall 18. In particular, the passage 25 is preferably delimited by the first partition wall 41, the third partition wall 43, the wall 17 and the wall 18.

It has been experimentally observed that the presence of the third partition wall 43 contributes to improve the water flow in tank 3 and to improve the homogeneity of steam coming out of steam generator 1.

Preferably, the steam generator 1, in particular the tank 3, is provided with at least two connecting portions 7a, 7b which constrain the steam generator 1 to the body of the oven 100. For example, each connecting portion 7a, 7b comprises a hole in which a respective screw can be inserted (not shown).

Some preferred, but not exclusive, dimensional details which can be considered individually or in any combination are provided below.

Preferably, the inner volume or maximum capacity of the tank 3, in particular its maximum capacity, is from 50 ml to 750 ml; and/or the inner volume of the third chamber 33 is lower than the inner volume of the first chamber 31 and/or than the inner volume of the second chamber 32, e.g. from 2 to 20 times lower; and/or the section area of the second passage 22 is larger than the section area of the first passage 21; and/or the section area of the second passage 22 is comprised between 150 and 1400 or between 230 and 930 mm$^2$; and/or the section area of the first passage 21 is between 60 and 590 or between 95 and 390 mm$^2$; and/or the section area of the third passage 23 is between 75 and 700 or between 115 and 460 mm$^2$; and/or the distance between the wall 12 and the wall 17 is between 5 and 150 or between 10 and 90 mm.

With regard to materials, the tank 3 is preferably made of plastic, e.g. thermoplastic polymer such as PPS, PC, PA, PP or POM, or metal, e.g. steel.

The first partition wall 41, is preferably made of metal, e.g. steel, but can also be made of plastic.

Preferably, the second partition wall 42 and, when provided, the third partition wall 43 are preferably made of plastic, e.g. thermoplastic polymer, e.g. such as PPS, PC, PA, PP or POM, but can also be made of metal, e.g. steel.

Note that the aforesaid walls 12, 14, 15, 16, 17, 18, 19 and 6, i.e. the bottom 6, and the aforesaid connecting portions 61, 62, 63, 64, 65, 66 are preferably outer walls of the steam generator 1, in particular, they comprise an outer face outside the tank 3 and an inner face inside the tank 3, opposite to the outer face.

Note that, one or more additional chambers or zones may be provided, divided by means of one or more additional partition walls or portions of partition walls, in addition to the three chambers or zones 31, 32, 33, or the four chambers or zones 31, 32, 33, 34.

For example, the third chamber or zone 33 can be divided into two chambers or zones by means of a partition wall, or into three chambers or zones by means of two partition walls and so on.

Note that the passages 21, 22, 23, and when provided, the passages 24, 25, 26 are, in particular, inside the tank 3; in particular completely inside the tank 3.

The invention claimed is:

1. A steam generator comprising:
   a tank provided with an inlet pipe suitable for introducing liquid into the tank and an outlet pipe suitable for releasing steam from the tank;
   at least one heating element adapted to heat the liquid to produce the steam;
   wherein the tank comprises:
   a first chamber;
   a second chamber;
   a third chamber, proximal to the outlet pipe;
   wherein the first chamber and the second chamber are adapted to contain the liquid introduced by means of said inlet pipe;
   wherein a first partition wall is provided, which partially separates the first chamber and the second chamber from each other;
   wherein a second partition wall is provided, which separates at least partially both the first chamber and the second chamber from the third chamber;
   wherein a first passage is provided which allows the steam to pass from the first chamber to the second chamber;
   wherein a second passage is provided which allows the steam to pass from the second chamber to the third chamber;
   wherein a third passage is provided which allows the liquid to pass between the second chamber and the first chamber;
   wherein the second partition wall comprises a first portion and a second portion which are mutually inclined; and
   wherein the first portion and the second portion form an angle, an apex of which faces a wall of the tank provided with the outlet pipe.

2. The steam generator according to claim 1, wherein the first chamber is proximal to the at least one heating element, and wherein the second chamber is distal from the at least one heating element.

3. The steam generator according to claim 1, wherein the third chamber is arranged between the outlet pipe and the first chamber, and between the outlet pipe and the second chamber.

4. The steam generator according to claim 1, wherein the third passage is proximal to the inlet pipe and/or wherein said third passage is partly delimited by a bottom of the tank.

5. The steam generator according to claim 1, wherein said third passage is delimited by a bottom of the tank and by the first partition wall.

6. The steam generator according to claim 1, wherein the first passage and the second passage are in an upper zone of the tank comprising the outlet pipe.

7. The steam generator according to claim 1, wherein the second passage is obtained in the second partition wall and/or wherein the first passage is at least partially delimited by the first partition wall.

8. The steam generator according to claim 1, wherein a fourth passage is provided which allows the liquid to pass from the third chamber to the first chamber and/or to the second chamber.

9. The steam generator according to claim 1, wherein the at least one heating element is constrained to a wall which delimits the first chamber.

10. The steam generator according to claim 1, wherein the first partition wall and the second partition wall are mutually transversal.

11. The steam generator according to claim 1, wherein a bottom of the tank is also a bottom of the first chamber and of the second chamber.

12. The steam generator according to claim 1, wherein a bottom of the tank forms an angle ($\beta$) with a wall of the tank; said angle ($\beta$) being greater than 90°.

13. The steam generator according to claim 1, wherein the tank comprises a fourth chamber which is proximal to the inlet pipe; wherein a third partition wall is provided, which separates at least partially both the first chamber and the second chamber from the fourth chamber.

14. The steam generator according to claim 1, wherein the tank is L-shaped.

15. The steam generator according to claim 1, wherein a venting pipe is provided proximal to the inlet pipe.

16. The steam generator according to claim 1, comprising at least one additional tank adapted to be connected to the tank.

17. An oven for steam cooking comprising a steam generator according to claim 1.

* * * * *